United States Patent Office 2,945,054
Patented July 12, 1960

2,945,054

O,O-DIALKYL S-[1-(2,2-DIHALOCYCLOPROPYL) ETHYL] PHOSPHOROTHIOLOTHIONATES

Marvin A. McCall and Harry W. Coover, Jr., Kingsport, Tenn., assignors to Eastman Kodak Company, Rochester, N.Y., a corporation of New Jersey No Drawing. Filed Aug. 21, 1958, Ser. No. 756,307

6 Claims. (Cl. 260—461)

This invention relates to new organophosphorus compounds and to their method of preparation. In a specific aspect this invention relates to the preparation of new organophosphorus compounds by the reaction of dialkyl phosphorothiolothionates with dihalovinylcyclopropanes and to the products of this process.

Organophosphorus compounds have evidenced marked utility and importance in many fields. For example, they have been employed as insecticides, fungicides, pesticides and in related uses. Consequently, it is of considerable importance to discover new and useful organophosphorus compounds and to have a new process for the production of organophosphorus compounds. Therefore, it is an object of this invention to provide new and useful organophosphorus compounds. It is another object of this invention to provide a novel method for preparing the new and useful organophosphorus compounds. It is still another object of this invention to provide new and valuable insecticides that can be used in various insecticidal compositions.

In accordance with this invention it has been found that new organophosphorus compounds, useful as insecticides, can be prepared by reacting dialkyl phosphorothiolothionates with certain dihalovinylcyclopropanes. The new products of this invention have the structural formula:

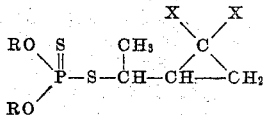

wherein R is selected from the group consisting of lower alkyl radicals containing 1 to 4 carbon atoms, haloalkyl radicals containing 1 to 4 carbon atoms and alkoxyalkyl radicals wherein the alkoxy and alkyl groups contain 1 to 4 carbon atoms and X is a halogen atom. Examples of the radicals represented by R are methyl, ethyl, propyl, butyl, chloroethyl, chloropropyl, trichloroethyl, and the like, methoxyethyl, methoxypropyl, and the like. In the compounds of this invention the radicals represented by R can be the same or different.

In preparing the products of this invention, dialkyl phosphorothiolothionates having the following structural formula are used:

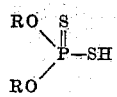

wherein R is as defined above. The dihalovinylcyclopropanes used in preparing the compounds of this invention have the structural formula:

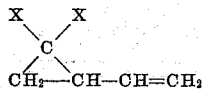

wherein X represents a halogen atom.

In the practice of this invention we prefer to add one of the reactants gradually to a reactor containing the other reactant. For example, the cyclopropane derivative can be added gradually to a reactor containing the dialkylphosphorothiolothionate. Alternatively however, the reverse procedure of addition of reactants can be used and the dialkylphosphorothiolothionate can be added to a reactor containing the cyclopropane derivative. Normally it is desirable to employ a reactor provided with adequate means of agitation and, since the reaction is quite exothermic, it is also desirable to employ a reactor that is provided with adequate cooling means.

The operable temperature range for the reaction is generally from −25 to 150° C. and the preferred temperature range is from 25 to 100° C. However, it will be realized that in some instances temperatures outside this range can be employed. The reaction time usually varies from 1 to 8 hours, but longer and shorter reaction periods are sometimes used. Normally it is unnecessary to employ a catalyst for the reaction since the dialkylphosphorothiolothionate will react with these cyclopropane derivatives in the absence of a catalyst. If it is considered desirable to employ a catalyst, there are certain catalysts that can be used, for example, the tertiary amines, such as triethyl amine, and the like.

Ordinarily, it is not necessary to employ a solvent for the reaction but in some instances solvents are desirable. Among the solvents that can be used are normally liquid aliphatic and aromatic hydrocarbons such as pentane, heptane, octane, benzene, toluene, the xylenes and the like, chlorinated derivatives of the above-mentioned hydrocarbons as well as the common ether and ester solvents. It is preferable to carry out the reaction using equimolar quantities of the reactants. However, it is within the scope of our invention to use any molar ratio of reactants.

The dihalovinylcyclopropanes used in practicing this invention can be prepared by the reaction of 1,3-butadiene with dihalocarbenes as described in J.A.C.S. 79 (1957), pages 2542–2544.

The following examples are illustrative of the compounds within the scope of this invention, their method of preparation and their utility as insecticides.

*Example 1.—O,O-diethyl S-[1-(2,2-dichlorocyclopropyl)ethyl] phosphorothiolothionate*

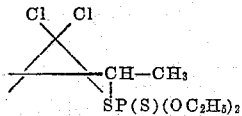

O,O-diethyl phosphorothiolothionate (0.1 mole) was added dropwise to 1,1-dichloro-2-vinylcyclopropane (0.1 mole) in a small round bottom flask equipped with a magnetic stirrer. The reaction was exothermic. It was allowed to stir at room temperature until the heat of reaction had dissipated. It was then warmed on a steam bath for 15 minutes. The product was a light straw-colored oil refractive index $N_D^{20}$ 1.5272.

*Example 2.—O,O-dimethyl S-[1-(2,2-dichlorocyclopropyl)ethyl] phosphorothiolothionate*

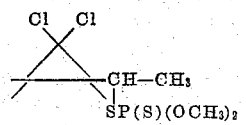

O,O-dimethyl phosphorothiolothionate (0.1 mole) was reacted with 1,1-dichloro-2-vinylcyclopropane (0.1 mole) in the same manner as described in Example 1 except that several drops of triethylamine was used as a catalyst. The product was a light yellow oil with good insecticide properties. $n_D^{20}$ 1.5435.

*Example 3.—O,O-bis(2,2,2-trichloroethyl) S-[2,2-dichlorocyclopropyl)ethyl] phosphorothiolothionate*

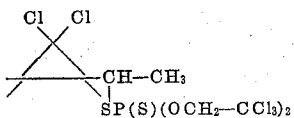

O,O-bis(2,2,2-trichloroethyl) phosphorothiolothionate (0.1 mole) was reacted with 1,1-dichloro-2-vinylcyclopropane (0.1 mole) in the same manner as described in Example 1 except that a few drops of pyridine was used as a catalyst. The product was a dark brown oil with good insecticidal properties.

*Example 4.—O-ethyl, O-methyl S-[1-(2,2-dichlorocyclopropyl)ethyl] phosphorothiolothionate*

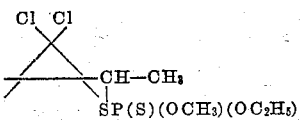

O-ethyl, O-methyl phosphorothiolothionate (0.1 mole) was added to 1,1-dichloro-2-vinylcyclopropane (0.1 mole) dissolved in 25 cc. of dry benzene containing 4 drops of triethylamine as catalyst. After the addition was completed the mixture was heated over a steam bath for 15 minutes. The reaction mixture was then vacuum stripped to remove the benzene solvent and any other volatile impurities. The product remaining was a dark oil with high or with good pesticidal properties. $n_D^{20}$ 1.5300.

*Example 5.—O,O-bis(2-methoxyethyl) S-[1-(2,2-dichlorocyclopropyl)ethyl] phosphorothiolothionate*

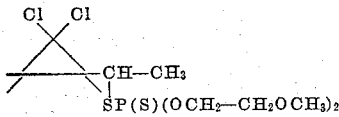

O,O-bis(2-methoxyethyl) phosphorothiolothionate (0.1 mole) was reacted with 1,1-dichloro-2-vinylcyclopropane (0.1 mole) in the same manner as described in Example 1. The product was an amber colored oil with good pesticidal properties.

*Example 6.—O,O-diethyl S-[1-(2,2-dibromocyclopropyl)ethyl] phosphorothiolothionate*

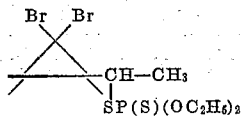

O,O-diethyl phosphorothiolothionate (0.1 mole) was reacted with 1,1-dibromo-2-vinylcyclopropane (0.1 mole) in the same manner as described in Example 1. The product was a red oil with good pesticidal properties.

*Example 7.—O-ethyl, O-methyl S-[1-(2,2-dibromocyclopropyl)ethyl] phosphorothiolothionate*

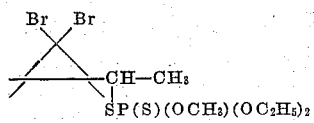

O-ethyl, O-methyl phosphorothiolothionate (0.1 mole) was reacted with 1,1-dibromo-2-vinylcyclopropane in the same manner as described in Example 1. The product was a dark amber colored oil with good pesticidal properties.

*Example 8.—Use of compounds as insecticides*

Tests against mites were carried out in the following manner. Acetone solutions containing 1% of the candidate compounds were prepared and diluted with water to give solutions of the desired concentration for testing. Two heavily infested bean leaves containing adult two spotted mites (*Tetranychus Bimaculatus* Harvey) were carefully dipped in the above solution and dried in a general air stream. The leaves were then placed on damp paper toweling in Petri dishes and observed after 24 hours for mortality among the adult mites. The percentage of the insects killed by different concentrations (parts per million) of toxicant can then be calculated; however, for comparison purposes it is sometimes more convenient to calculate the concentration of toxicant needed to kill 85% of the test insects. This concentration in parts per million is known as the minimum lethal dose required to kill 85% of the test insects and is abbreviated L.D. 85. The toxicity data for the compounds of this invention are given in Table I. It should be noted that tests using acetone water solutions (containing none of the toxicant) killed none of the mites.

TABLE I

| Toxicant | Conc. of Toxicant in p.p.m. | Percent Kill of Mites |
|---|---|---|
| 1. O,O-Diethyl S-[1-(2,2-dichlorocyclopropyl)ethyl] phosphorothiolothionate (Example 1) | 100<br>30<br>10 | 80<br>88<br>88 |
| 2. O,O-Dimethyl S-[1-(2,2-dichlorocyclopropyl)ethyl] phosphorothiolothionate (Example 2) | 100<br>30<br>10 | 84<br>90<br>90 |
| 3. O-Ethyl, O-methyl S-[1-(2,2-dichlorocyclopropyl)ethyl] phosphorothiolothionate (Example 4) | 100<br>30<br>10 | 96<br>87<br>85 |
| 4. O,O-Diethyl S-[1-(2,2-dibromocyclopropyl)ethyl] phosphorothiolothionate (Example 6) | 100<br>30<br>10 | 90<br>86<br>84 |

The products obtained in Examples 3, 5, and 7 also showed strong pesticidal activity against mites when used in the above tests. The above products were also active against other insects. For example, the product of Example 1 was found to be valuable as a fly killer (L.D. 85 at 750 p.p.m.), and as an ovicide (L.D. 85 at 8–9 p.p.m.). It was also active against aphids (killing 87% at 100 p.p.m. concentration) and nematodes (killing 88% at 100 p.p.m. concentration).

This invention has been described in detail with particular reference to preferred embodiments thereof, but it will be understood that variations and modifications can be effected within the spirit and scope of the invention as described above and as defined in the appended claims.

We claim:

1. The organophosphorus compounds having the structural formula:

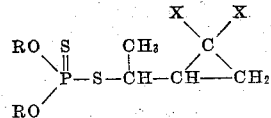

wherein each R is selected from the group consisting of lower alkyl radicals, lower haloalkyl radicals and lower alkoxyalkyl radicals and X is a halogen atom.

2. O,O-diethyl S-[1-(2,2 - dichlorocyclopropyl)ethyl] phosphorothiolothionate.

3. O,O-dimethyl S-[1-(2,2-dichlorocyclopropyl)ethyl] phosphorothiolothionate.

4. O,O-bis(2,2,2-trichloroethyl) S-[1-(2,2 - dichlorocyclopropyl)ethyl] phosphorothiolothionate.

5. O-ethyl, O-methyl S-[1-(2,2-dichlorocyclopropyl)-ethyl] phosphorothiolothionate.

6. O,O - diethyl S-[1-(2,2-dibromocyclopropyl)ethyl] phosphorothiolothionate.

References Cited in the file of this patent

UNITED STATES PATENTS 2,565,920     Hook et al.            Aug. 28, 1951

OTHER REFERENCES

Mastryukova et al.: Bull. Acad. Sci., U.S.S.R., Div. Chem. Sci. (1956), pp. 433–4 (English translation).